United States Patent
Chapman et al.

(10) Patent No.: US 7,211,629 B2
(45) Date of Patent: May 1, 2007

(54) PROCESS FOR THE PREPARATION OF LOW FUMING FLUOROPOLYMER

(75) Inventors: Gregory Allen Chapman, Washington, WV (US); David E. Bidstrup, Parkersburg, WV (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 266 days.

(21) Appl. No.: 10/836,434

(22) Filed: Apr. 30, 2004

(65) Prior Publication Data

US 2005/0245725 A1 Nov. 3, 2005

(51) Int. Cl.
*C08L 27/12* (2006.01)

(52) U.S. Cl. .................. 525/192; 525/199; 525/326.4; 526/252; 526/254

(58) Field of Classification Search ............ 525/192, 525/199, 326.4; 526/252, 254
See application file for complete search history.

(56) References Cited

U.S. PATENT DOCUMENTS

| 4,626,587 A | | 12/1986 | Morgan et al. |
| 4,743,658 A | * | 5/1988 | Imbalzano et al. ...... 525/326.4 |
| 5,302,686 A | * | 4/1994 | Tanaka et al. ............ 428/35.7 |
| 5,309,148 A | * | 5/1994 | Birk ........................ 340/628 |
| 5,318,358 A | | 6/1994 | Wobbe et al. |
| 5,932,159 A | | 8/1999 | Rauwendaal |
| 6,395,848 B1 | * | 5/2002 | Morgan et al. ............ 526/214 |
| 2003/0208005 A1 | | 11/2003 | Hiraga et al. |
| 2005/0245709 A1 | * | 11/2005 | Chapman et al. ........... 526/253 |

FOREIGN PATENT DOCUMENTS

| EP | 0 928 673 A1 | | 7/1999 |
| EP | 1 170 303 A1 | | 1/2002 |
| EP | 1170303 A1 | * | 1/2002 |
| WO | WO02/50135 A1 | | 6/2002 |

OTHER PUBLICATIONS

William C. Seidel, et al., Chemical, Physical, and Toxicological Characterization of Fumes Produced by Heating Tetrafluoroethene Homopolymer and Its Copolymers with Hexafluoropropene and Perfluoro(Propyl Vinyl Ether), Chem. Res. Toxicol., 1991, 4, pp. 229-236.

* cited by examiner

*Primary Examiner*—David W. Wu
*Assistant Examiner*—Henry S. Hu

(57) ABSTRACT

The present invention relates to the reduction of oligomer content of melt-processible fluoropolymer so that the fluoropolymer has at least 25 ppm less oligomer than the as-polymerized fluoropolymer, the reduction being obtained by melting the fluoropolymer forming a surface of molten fluoropolymer and regenerating this surface, contacting the regenerating surface with inert gas, and devolatilizing the resultant molten fluoropolymer.

5 Claims, No Drawings

PROCESS FOR THE PREPARATION OF LOW FUMING FLUOROPOLYMER

BACKGROUND OF THE INVENTION

1. Field of the Invention

This invention relates to a process for reducing the fuming of melt-processible fluoropolymer, which is characterized by reduced particulate emissions at elevated temperatures.

2. Description of Related Art

Fluoropolymer can be described as having certain number average or weight average molecular weight, but it is well-known that it is made up of polymer chains of various molecular weights, The smaller polymer chains comprise the lower molecular weight fractions of the polymer and can be described as oligomers. In melt processing these oligomers have some volatility and can separate from the mass of molten polymer, forming particulate that can cause polymer fume fever as disclosed in Seidel et al., "Chemical, Physical, and Toxicological Characterization of Fumes Produced by heating Tetrafluoroethylene Homopolymer and its Copolymer with Hexafluoropropylene and Perfluoro(propyl vinyl ether)", *Chem. Res. Toxicol.* 1991, 4, 229–236.

It is desirable to have fluoropolymer that has reduced particulate emissions at elevated temperatures.

BRIEF SUMMARY OF THE INVENTION

The present invention satisfies this desire by providing a process for lowering the amount of oligomer in melt-processible fluoropolymer as compared that in the as-polymerized fluoropolymer, so as to reduce the emission of particulates by the fluoropolymer. Thus, the present invention is a process for lowering the oligomer content of melt-processible fluoropolymer, comprising (a) melting said fluoropolymer, (b) forming a surface of said molten fluoropolymer, (c) regenerating said surface, (d) contacting said regenerating surface of said molten fluoropolymer with inert gas, (e) devolatilizing the resultant molten fluoropolymer to obtain as a result thereof said fluoropolymer having less oligomer, and (e) cooling the devolatilized fluoropolymer.

As determined by the amount of oligomer that can be removed from fluoropolymer, the trace amounts of oligomer present in fluoropolymers as reported in Seidel et al. is measurable in parts (weight) per million (ppm). The process of the present invention can produce melt-processible fluoropolymer that has at least about 25 ppm oligomer less than the oligomer content of the fluoropolymer as-polymerized. The amount of oligomer in the fluoropolymer is the result of premature termination of the polymer chain during the polymerization process; this is the as-polymerized oligomer content of the fluoropolymer.

Since the volatile material that is emitted from the fluoropolymer is particulate material, which is referred to herein as oligomer, the reduction in oligomer content can be characterized by reduced emission of particulates, which can be detected by voltage change from an ionizing smoke detector. The fluoropolymer obtained from the process described above, upon being subjected to the Smoke Detector Test is characterized by exhibiting a reduction in voltage change of at least about 20% of the voltage change exhibited by the as-polymerized fluoropolymer at the upper continuous use temperature of the fluoropolymer. The upper continuous use temperature for fluoropolymers is established and published by the fluoropolymer manufacturer. The Smoke Detector Test is essentially the measurement equipment and procedure referred to in Seidel et al. and will be described in greater detail later herein.

For melt-processible tetrafluoroethylene/hexafluoropropylene (TFE/HFP) copolymer commonly known as FEP, the reduced emission of particulates of the FEP obtained from the process described above is characterized by said FEP exhibiting a voltage change of either no greater than about 0.025 volts at 200° C. or no greater than about 2 volts at 350° C. when subjected to the Smoke Detector Test.

DETAILED DESCRIPTION OF THE INVENTION

The oligomer content of melt-processible fluoropolymers can be characterized by the reduction of oligomer content under a condition used in industry most likely to reduce oligomer content. In particular, the melt extrusion of fluoropolymers sometimes includes a devolatilization zone in the extruder just prior to the extrudate existing the extruder. The high temperature of the fluoropolymer melt within the extruder provides the best opportunity for the oligomer to volatilize and the subsequent devolatilization zone provides the best opportunity for removal of the oligomer from the molten polymer. It is known to sparge a bed of fluoropolymer pellets after extrusion and at elevated temperatures well below the melting temperature of the fluoropolymer to remove residual gases trapped in the solids, but sparging cannot remove the higher boiling oligomers and the temperature of sparging must be kept low enough to avoid having the fluoropolymer pellets being sparged stick together, i.e. "block".

According to the process of the present invention, the fluoropolymer is first subjected to melting, followed by creating an infinite surface for the molten fluoropolymer, similar to the boiling of a liquid, wherein molecules can depart from the liquid from any and all portions thereof. This is the regeneration of the surface of molten fluoropolymer. A critical aspect of this process is that the regenerating surface of molten polymer is contacted with inert gas. The gas sweeps the volatile oligomer from the regenerating surface of the polymer melt. This is apparent from the next step of subjecting the molten polymer to devolatilization, which separates the volatilized oligomer from the molten polymer. The separated oligomer can then be collected within the vacuum system, and its weight can be compared with the weight of fluoropolymer being melt processed to determine the proportion (ppm) of oligomer removed from the fluoropolymer. When the gas is omitted, the oligomer removal, as described above, falls to less than 1/10 of the amount removed when the gas is used. The greater amount of oligomer that is removed when gas is used remains in the fluoropolymer when gas is not used. This amount can be considered to be included in the as-polymerized amount of oligomer present in the fluoropolymer.

The process just described is not conventional in fluoropolymer melt processing, which is generally carried out to minimize the exposure of the fluoropolymer to high melt temperature for a period of time that would cause the fluoropolymer to degrade and to avoid exposing the fluoropolymer to such high shear that it causes the fluoropolymer to degrade. The exception to this precaution is the intensive extruder shearing of FEP disclosed in U.S. Pat. No. 4,626,587 to eliminate polymer chain HFP diads and triads, and wherein the degraded polymer is subjected to fluorine treatment after extrusion to eliminate the visual effects of the degradation. Degradation may be visible by discoloration of the extruded fluoropolymer. Otherwise the degradation becomes apparent from the deterioration of one or more physical properties, such as flex life, tensile strength, or elongation to break.

The process described above for lowering the oligomer content of the fluoropolymer can be carried out in an extruder that contains a zone in which the molten fluoropolymer is subjected to surface regeneration without excessive shear and within time/temperature condition to avoid degradation, and gas is injected into this zone to contact the constantly regenerating surface of molten fluoropolymer to sweep out the volatilizing oligomer. The surface regeneration creates the infinite surface, simulating the boiling of a liquid, wherein the amount of surface is not measurable, but its infinite nature is indicated by the ability of the gas to sweep oligomer from the melt, revealing the extent to which interior portions of the molten resin are brought to the surface of the molten fluoropolymer. The extent of surface renewal is not measured, but its existence is revealed by the removal of oligomer from the fluoropolymer.

The use of an extruder for carrying out the process of the present invention enables the process to be carried out continuously. Thus, the melting step is practiced in the zone of the extruder just downstream from the feed/compression zone of the extruder. The surface regeneration/gas contact zone of the extruder follows the melting zone, so that the molten fluoropolymer continuously advances from the melting zone to the surface regeneration/gas contact zone. Preferably, the melting zone is isolated from the surface regeneration/gas contact zone by a melt plug, i.e. molten fluoropolymer completely filling the usable volume of the extruder (volume not occupied by the extruder screw). This enables the gas injected into the latter zone to be controlled and limited to contact with the regenerating surface of the molten fluoropolymer.

In the surface regeneration/gas contact zone, the usable volume of the extruder is also is not completely filled with polymer. Sufficient volume remains, referred to herein as free volume, to enable the inert gas to have open space, i.e. space unoccupied by the molten fluoropolymer and screw elements that accomplish the surface regeneration of the molten fluoropolymer, to be able to reach the regenerating surface of the molten fluoropolymer. The presence of free volume in this zone enables the molten fluoropolymer to form a surface, i.e. a free surface, wherein the molten fluoropolymer is not in contact with any solid surface. The free volume in this zone provides the surface of the molten fluoropolymer. The regeneration of the surface of molten fluoropolymer constantly provides new surfaces of molten fluoropolymer for contact with the inert gas, thereby enabling the inert gas to sweep the volatilizing oligomer from the fluoropolymer melt. This surface regeneration can be achieved by repeatedly subdividing the molten fluoropolymer. The combination of surface regeneration and free volume, enabling the inert gas to circulate within the surface regeneration/gas contact zone, allows the gas to assist in the oligomer removal.

The surface regeneration of the molten polymer is simultaneous and repetitive. Thus, the molten fluoropolymer is subdivided into a large number of separate streams at one time and this subdividing is repeated a plurality of times within the surface regeneration/gas contact zone to expose new surfaces of molten fluoropolymer to the inert gas. Kneading blocks subdivide molten polymer into at most three portions for bilobal geometries or five portions for trilobal geometries. The subdividing used in the present invention preferably divides the molten polymer into at least six portions, preferably at least 8 portions, and this subdivision is repeated at least twice within the surface regeneration/gas contact zone. Such subdivision can be achieved in a twin screw extruder by using gear or turbine type mixing elements positioned along the extrusion screws within the surface regeneration/gas contact zone. Examples of such mixing elements are the SME, TME, and ZME screw elements that are commercially available from Coperion Corporation, wherein the screw flights contain interruptions in the form of notches around their peripheries, at least 6 interruptions in one rotation of each periphery. The ZME element is described in U.S. Pat. No. 5,318,358 and is depicted as multiple elements in FIG. 4. As shown in FIG. 1, the ZME elements are reverse pumping with respect to the fluoropolymer being advanced through the extruder by the extrusion screw. Thus, the ZME elements pump the molten polymer backwards (countercurrent) towards the feed end of the extruder, while the notches (slots) in the periphery of the elements permit small streams of molten polymer to advance forward through the slots, thus obtaining subdividing of the molten polymer into small portions, at least 10 for each ZME element shown in n FIG. 4, which can be used in the present invention. The SME elements resemble the ZME elements but pump the molten polymer forward, while the slots in its periphery cause small streams of molten polymer to be formed in a countercurrent pumping action. The TME elements are neutral with respect to pumping action, i.e. they resemble a gear, whereby the neutral flight of this element tends to hold up flow of molten polymer, while the peripheral slots permit small streams of molten polymer to pass through the TME element. These elements can be used in succession within the surface regeneration/gas contact zone to accomplish the surface regeneration necessary for contact of the molten surfaces with the inert gas to cause the removal of oligomer from the molten fluoropolymer.

Other types of mixing elements can be used in combination with these ZME, SME, or TME elements or in place thereof, such as mixing elements containing pins or studs extending from the extruder screw, which disrupt the flow of molten polymer, thereby exposing new surface of the polymer for contact with the gas phase, such as shown in FIGS. 2A, and 2D of U.S. Pat. No. 5,932,159. It is also possible to put the pins or studs in the barrel if a corresponding relief is made in the screw, such as in a Buss Kneader® produced by Coperion Corporation. Another alternative that can be used is cavities or reliefs cut into either/or the screw channel and the extrusion barrel as shown in FIG. 2F of U.S. Pat. No. '159. The interruptions and disruptions of the molten fluoropolymer in the zone represent a subdividing of the fluoropolymer, including the recombining of the molten fluoropolymer, this occurring a plurality of times within the surface regeneration zone/gas contact, each time exposing new surfaces of molten fluoropolymer making them accessible to the inert gas.

The surface regeneration occurring is more analogous to distributive mixing than dispersive mixing. In distributive mixing, two or more molten polymers having similar melt viscosities are mixed together using equipment that accomplishes the mixing using relatively low shear. In contrast, equipment used for dispersive mixing subjects molten polymer to high shear to break down polymer agglomerates, such as gel particles. The high shear associated with dispersive mixing has the disadvantage of excessively degrading the molten fluoropolymer, creating unstable end groups and discoloration if too much dispersive mixing is used. U.S. Pat. No. 5,932,159 discloses and depicts a variety of distributive mixing devices and dispersive mixing devices, and describes the use of kneading blocks to accomplish dispersive mixing (col. 3, l. 47–48). While the surface regeneration carried out in the process of the present invention is like distributive mixing, the subdividing provides a different result, i.e. the constant regeneration of new molten fluoropolymer surface to permit contact by the inert gas to cause oligomer removal from the molten fluoropolymer, rather than the mere mixing together of different polymers.

Notwithstanding the extensive subdividing of the molten fluoropolymer in the surface regeneration/gas contact zone and allowing for the possibility of portions of the molten fluoropolymer repetitively including intervals of countercurrent flow, this zone has free volume within the entire zone or within portions thereof. In an extruder, such as a twin screw extruder, this zone will be a continuation of the melting zone, i.e. the extruder barrel will have the same cross-sectional area in both zones, but the surface regeneration/gas contact zone will be separated from the melting zone by a melt plug as described above and will contain free volume. The melt plug that separates the zones can be achieved by a number of techniques including, but not limited to, utilizing a reverse pitch element, utilizing an element that restricts polymer flow, reducing the cross-sectional free area, and/or using a diminished pitch element at the end of the melting zone. The creation of free volume downstream from the melt plug and within the surface regeneration/gas contact zone is normally achieved by increasing the free volume to a volume greater than the volume of the melt in the surface regeneration/gas contact zone. This can be achieved through several techniques with the most common being to increase the forward pitch of the elements, but it can also be achieved by changing the cross-sectional geometry of the screw(s) to increase the free volume. Either technique or the combination thereof can be used in the practice of the present invention.

The melting of the fluoropolymer can be carried out either in the same extruder that is used for the surface regeneration/gas contact or in a separate device. The use of the same extruder for both melting and surface regeneration/gas contact is usually more economical. If the melting occurs in the same extruder as the surface regeneration/gas contact, the melting would normally occur by conventional means by the application of sufficient heat, usually at least 40° C. greater than the melting temperature of the fluoropolymer, and mechanical energy input for sufficient time to cause the fluoropolymer to become molten. Since molten fluoropolymer generally has a high viscosity, it is preferred that the temperature of the melt is at least 30° C. above the melting point of the fluoropolymer. The melting point of the fluoropolymer is the peak of the endotherm obtained using the thermal analyzer in accordance with the procedure of ASTM 3159. When the process is carried out in an extruder, the configuration of the screw or screws, if the extruder is a twin screw extruder, can be conventional to convey the fluoropolymer from the feed end of the extruder towards the surface regeneration/gas contact zone, while the melting of the fluoropolymer occurs from the input heating and the mechanical energy from the extrusion screw advancing the fluoropolymer through the melting zone. The conveyance of the molten fluoropolymer through the melting zone continues into the surface regeneration/gas contact zone, whereupon the screw elements present in the latter zone, while accomplishing the subdividing described above, continue the conveyance of the molten fluoropolymer through such zone and towards the outlet of the extruder.

With respect to process step (d), the contacting of the molten fluoropolymer with inert gas occurs preferably by feeding the gas into the surface regeneration/gas contact zone independently of the feed of the molten fluoropolymer into this zone. This, together with the isolation of the surface regeneration/gas contact zone from the melting zone, enables the amount of inert gas to be controlled and isolated from the feed end of the processing equipment and leads to recovery of the inert gas, whose discharge from the extruder is then limited to the downstream portion thereof.

The feed of inert gas can come from a single or multiple inlet ports into the surface regeneration/gas contact zone and the gas is preferably in the form of a fluid, which at the temperature of the molten fluoropolymer, can be at, above, or below the critical temperature of the gas, and can be a gas or a liquid that volatilizes to gas at the temperature present in the zone.

Any inert gas can be used. By "inert" is meant that the gas does not react with the fluoropolymer under the conditions present in the surface regeneration/gas contact zone. The function of the gas is to sweep oligomer from the constantly regenerating surface of molten fluoropolymer. Although reactive gas, such as HF, may be generated by the action of the high temperature on the molten polymer in either the melting zone or the surface regeneration/gas contact zone, the presence of such gas is in such a small amount as to be inconsequential with respect to assisting the removal of oligomer from the molten fluoropolymer. The gas contact in the surface regeneration/gas contact zone can be carried out in the absence of reactive gas being injected into the zone from the outside of the extruder, i.e. without externally added reactive gas. Examples of inert gas include, but is not limited to, nitrogen, argon, helium, krypton, neon, xenon, carbon dioxide, and hydrochlorofluorocarbons, with nitrogen being preferred because of relatively low cost. The amount of inert gas fed into the zone will be that which is effective to result in the removal of at least 25 ppm of oligomer from the fluoropolymer. Typically, from 1,000 to 100,000 ppm by weight of inert gas with respect to polymer will be fed into the zone. The exact amount will depend on the level of oligomers and the properties of the gas.

The surface renewal of the molten polymer occurring in the presence of gas contact creates the infinite surface of the molten fluoropolymer, enabling the oligomer to be removed from the fluoropolymer. This removal occurs in a short residence time of the fluoropolymer in the surface regeneration/gas contact zone, usually no more than about 120 seconds and preferably no more than about 60 sec. The residence time in the surface regeneration/gas contact zone according to this invention is determined as follows: The residence time, $\Theta$, in elements that are considered to be fully filled with polymer is $\Theta = V/q$, where V is the useable volume of the element and q us the volumetric throughput rate. For the elements that are not fully filled, $\Theta = 2L/ZN$, where L is the length of the reaction zone that contains the bushings, Z is the pitch (the axial distance required for a single rotation of the screw), and N is the screw speed. The residence times for all elements are summed to obtain the total residence time in the reaction zone. The 1 mm spacers (between elements) are ignored because they comprise less than 1% of the length of the surface regeneration/gas contact zone in the Examples disclosed herein.

The molten fluoropolymer is then continuously advanced to a devolatilizing zone, where the oligomer is removed from the molten fluoropolymer. The surface renewal zone and the devolatilization zone are separated by a plug of molten fluoropolymer by such means as described above for the plug between the melting zone and the surface regeneration/gas contact zones. This enables the gas to intimately contact the molten fluoropolymer in the latter zone without being prematurely removed in the devolatilization zone. Notwithstanding the presence of the plug of molten fluoropolymer separating the surface regeneration/gas contact zone from the devolatilization zone, the oligomer volatilizing and being swept out of the fluoropolymer in the surface regeneration/gas contact zone is removed in the devolatilization zone. After devolatilization, the fluoropolymer is cooled.

Provision of the surface regeneration/gas contact zone within the extruder as described above creates extruder conditions most favorable to removing oligomer from the fluoropolymer, provided that devolatilization is also practiced in the extruder. When no gas is introduced into the surface renewal zone and the molten fluoropolymer is subjected to devolatilization, the amount of oligomer collected from devolatilization corresponds to 2 ppm. When the same fluoropolymer is treated in the same way, except that an inert gas such as is introduced into the surface regeneration/gas contact zone, the amount of oligomer collected is more than 10× the amount collected when no gas is used. At least 25 ppm of oligomer is removed. An Example with this information and details about the extrusion equipment used to obtain this improvement are presented later herein. The elements accomplishing the surface regeneration are selected in accordance with the requirements of the fluoropolymer to obtain the infinite surface required without adversely affecting the fluoropolymer. The Example provides a selection and arrangement of elements for the particular fluoropolymer being melt processed This selection and arrangement is useful for oligomer removal from melt-processible fluoropolymers in general. One skilled in the art, however, knowing the melt processing characteristics of other fluoropolymers and the need for obtaining infinite surface to provide for optimum oligomer removal, can choose different elements and arrange them differently to obtain a different result from that obtained from the selection and arrangement of elements set forth in the Example is used.

The fluoropolymer can also be subjected to the Smoke Detector Test, which is essentially the measurement equipment and procedure referred to in Seidel et al. and will be described in greater detail later herein, to measure the reduced particulates of the fluoropolymer treated by the process of the present invention, as the indicator of its reduced oligomer content as compared to the as-polymerized fluoropolymer.

The process of the present invention is applicable to fluoropolymers in general, with temperature, tolerable shear, and residence time conditions dependent on the particular fluoropolymer. This together with the extruder components (elements) to obtain the condition of infinite surface in the surface regeneration/gas contact zone are selected to achieve the removal of oligomer without degrading the fluoropolymer.

Examples of melt processible fluoropolymers that can be melt processed in accordance with the process of the present invention to a lower oligomer content are copolymers of tetrafluoroethylene (TFE), with one or more of comonomers in sufficient amount to render the copolymer melt processible. The comonomers can be perfluorinated or other monovalent atoms, such as hydrogen and chlorine, in addition to fluorine can be substituted on the carbon atom chain as can pendant groups on ether linkages attached to the carbon atom chain, the fluoropolymer nevertheless containing at least about 35 wt % fluorine. By "melt-processible" it is meant that the fluoropolymer flows when heated, as distinguished from polytetrafluoroethylene, which has such a high melt viscosity that it does not flow when heated. The melt-processibility of the fluoropolymer also means that it can be melt-fabricated by such processes as extrusion and injection molding into such final articles as films, fibers, tubes, wire coatings and the like. The removal of oligomer can be part of the melt fabrication process to obtain the desired final article or can be separate from melt-fabrication, to first form pellets that are subsequently used in melt-fabrication of the desired final article.

Melt processibility generally requires that the melt viscosity be no more than about $10^6$ Pa·s. Preferably it is in the range of about $10^2$ to $10^6$ Pa·s, and most preferably about $10^4$ to $10^6$ Pa·s. Melt viscosities of the melt-processible perfluoropolymers are measured according to ASTM D 1238-52T, modified as follows: The cylinder, orifice and piston tip are made of a corrosion-resistant alloy, Haynes Stellite 19, made by Haynes Stellite Co. The 5.0 g sample is charged to the 9.53 mm (0.375 inch) inside diameter cylinder, which is maintained at 372° C.±1° C., such as disclosed in ASTM D 2116 and ASTM D 3307 for perfluorinated polymers. Five minutes after the sample is charged to the cylinder, it is extruded through a 2.10 mm (0.0825 inch) diameter, 8.00 mm (0.315 inch) long square-edge orifice under a load (piston plus weight) of 5000 grams. This corresponds to a shear stress of 44.8 kPa (6.5 pounds per square inch). The melt viscosity in Pa·s is calculated as 53170 divided by the observed extrusion rate in grams per 10 minutes. The melt viscosity of fluoropolymers containing hydrocarbon groups in the polymer chain can be determined in accordance with ASTM procedures for these particular polymers, such as ASTM D 3159 and ASTM D 5575.

One example of fluoropolymer is the copolymer of TFE with hexafluoropropylene (HFP), commonly known as FEP. Additional copolymerized monomer may be present in the FEP such as perfluoro(ethyl or propyl vinyl ether). Ethylene may also be copolymerized with the TFE and HFP to form EFEP. Another example of fluoropolymer is the copolymer of TFE with perfluoro(alkyl vinyl ether) (PAVE), and perfluorodimethyl dioxole (PDD). TFE/PAVE copolymers are commonly known as PFA, which can include MFA. PAVE include perfluoro(alkyl vinyl ether), wherein the alkyl group contains from 1–8 carbon atoms, preferably 1 to 3 carbon atoms, such as perfluoro(propyl vinyl ether) (PPVE), perfluoro(ethyl vinyl ether) (PEVE), and perfluoro(methyl vinyl ether) (PMVE) or mixtures thereof. The copolymer of TFE/PMVE and PPVE is commonly known as MFA. PFA is commonly used in extrusion and injection molding to make processing equipment for use in semiconductor manufacture, wherein extreme purity and chemical inertness of the processing equipment is essential. Much technology has been developed to enhance the chemical inertness of the PFA and to provide smooth surfaces of the PFA-fabricated equipment. The emission of particulates, even in minute amounts, during semiconductor manufacture, can contaminate the semiconductor, causing it to be discarded. The reduction in oligomer content in TFE/PAVE copolymers provides an improved fluoropolymer for use in semiconductor processing.

Still another example of fluoropolymer is that which contains hydrocarbon groups in the polymer chain, e.g. the copolymers of tetrafluoroethylene or chlorotrifluoroethylene with ethylene, known as ETFE and ECTFE, respectively and copolymers of tetrafluoroethylene/hexafluoropropylene/vinylidene fluoride, known as THV.

The fluoropolymers may be crystalline or amorphous. By crystalline is meant that the polymers have some crystallinity and are characterized by a detectable melting point measured according to ASTM D 3418, and a melting endotherm of at least about 3 J/g. Melt-processible polymers that are not crystalline according to the preceding definition are amorphous. Amorphous polymers include elastomers, which are distinguished by having a glass transition temperature of less than about 20° C. as measured according to ASTM D 3418.

After cooling, the reduced oligomer fluoropolymer may be subjected to sparging, such as by heating in an air oven at 150° C. to remove any additional dissolved gases that may be present in the fluoropolymer arising from melt fabrication after the devolatilization and cooling step of the process of the present invention.

EXAMPLES

All of the melt processing in the Examples is carried out with a 57 mm twin-screw extruder, equipped with an injection probe, which is a rod having a longitudinal bore opening flush with the interior surface of the extruder barrel in the surface renewal zone, and a vacuum port in the devolatilization zone. The twin screw extruder feeds the molten fluoropolymer into a 120 mm single-screw extruder, which is equipped with a die. The twin-screw extruder serves as a resin melter and oligomer remover and the single-screw extruder serves as a melt pump to generate the pressure necessary to move the resin through the screen pack and die. Polymer exiting the die is cut and cooled.

The twin-screw extrusion equipment described above is a Kombiplast® extruder from the Coperion Corporation. Corrosion-resistant materials are used for those parts that come into contact with the polymer melt. The twin-screw extruder has two corotating screws disposed side by side. The screw configurations are designed with an intermeshing profile and close clearances, causing them to be self-wiping. The screw configurations include kneading blocks, mixing elements, and conveying bushings. The first 15 Length/Diameter units (L/D, L being the interior length of the extruder barrel D being the diameter of the bushings) of the extruder is the melting zone. This contains the feeding, solids conveying, and kneading block sections. The kneading block sections provide high shear and insure proper melting of the polymer. The melting section ends with a left handed bushing (rearward pumping) that forms a melt seal and insures complete filling of the final kneading blocks. The melt seal forms the entry into the surface renewal zone.

The next 19 L/D contain the extruder screw elements that create the infinite surface of the molten fluoropolymer and convey the molten fluoropolymer towards the devolatilization zone, i.e. these elements form the surface regeneration/gas contact zone. The extruder elements include mixing elements that accomplish the surface renewal at low shear as the molten fluoropolymer passes through the surface renewal zone. The elements making up the surface renewal zone contain one 80 mm undercut conveying bushing (also known as a SK bushing where 80 mm is both the length of the element and the pitch of the helical flight in one revolution of the element), one 40 mm conveying bushing that transitions from undercut to standard (also known as a SK-N bushing where 40 mm is the length of the element and the pitch of the helical flight in one revolution of the element is 80 mm), two 40 mm conveying bushings (40 mm is both the length of the element and the pitch of the helical flight in one revolution of the element), two 30 mm ZME elements (where 30 mm is the length of the element, and the pitch of the helical flight in one revolution of the element is 15 mm), one 40 mm conveying bushing, three SME elements (40 mm is both the length of the element and the pitch of the helical flight in one revolution of the element), two 40 mm conveying bushings, four TME elements (20 mm is the length of the element and there is no pitch), two 40 mm conveying bushings, three TME elements, two 40 mm conveying bushings, two ZME elements, two 40 mm conveying bushing, one 30 mm conveying bushing (30 mm is both the length of the element and the pitch of the helical flight in one revolution of the element) and a 20 mm left-handed bushing (where 20 mm is the length of the element and the pitch of the helical flight in one revolution of the element is 40 mm) to provide a melt seal with respect to the devolatilization zone. Each ZME, TME, and SME element has at least 10 notches in the periphery of its respective flights. All these elements are bilobal (two flights per element), except for the ZME which has only one lobe (one flight) and the TME element which is a cylindrical notched disc. A 1 mm thick spacer ring is present between conveying bushings and ZME elements. The elements making up the surface renewal zone do not cause the molten fluoropolymer to fill up this zone, i.e. vapor space is available and in contact with the small streams of molten fluoropolymer being created and recreated by the multiple ZME, TME and SME elements. The surface renewal zone includes a gas injection port positioned near the beginning of the zone to feed gas into the zone, if used in the particular melt processing of the Example. The residence time of the molten fluoropolymer in the surface renewal zone is 35 seconds.

The next 5 L/D contains the vacuum extraction section (devolatilization zone). The devolatilization zone includes melt forwarding elements that provide for free volume, so that the molten polymer is exposed to subatmospheric pressure so that reactive and corrosive gases do not escape into the atmosphere. The vacuum used in the devolatilization zone in the Examples is 13.7 psia (95 kPa).

Undercut bushings (SK) are an effective way to provide the forwarding elements in the devolatilization zone in the Examples. The final 2 L/D are used to provide a vacuum seal and pump the molten polymer into the single-screw extruder. The vacuum applied to the devolatilization zone communicates with a cylindrical chamber between the vacuum source and the devolatilization zone, and the vacuum is applied through a tared 50 mesh screen positioned across this chamber. The volatilized oligomer condenses on this screen. Removal of the screen and weighing of the condensed oligomer while on the screen reveals the amount of oligomer removed. Comparison of this weight of oligomer with the weight of fluoropolymer melt processed in the extruder during the time of oligomer collection on the screen reveals the weight proportion of oligomer that was formerly present in the fluoropolymer prior to oligomer removal. Without the presence of the screen or other collection device, the effect of oligomer removal as part of the melt processing operation could not be detected.

The waxy solid recovered from the screen is heated in a gas chromatograph (GC) to 250° C. and the resulting gas stream is analyzed. The GC peaks indicate a broad distribution of perfluorinated carbon compounds between $C_{11}F_{24}$ and $C_{20}F_{42}$. Some residual material remains indicating that even higher boiling components are present. This analysis indicates that the waxy solid is a mixture of fluorocarbon oligomers.

The twin-screw extruder empties into a single-screw melt pump, which is designed to generate pressure at low shear rates for filtration and pellet formation. The extruded melt is melt cut through a die with 250 die holes (2.5 mm). The pellets are cooled by a stream of water.

Both the twin-screw extruder and the single-screw extruder are operated with barrel set-point temperatures of 300° C. except for the die, which is set at 350° C.

Example 1

A compacted flake of a copolymer of tetrafluoroethylene (TFE), with 12.0 to 12.3 weight percent hexafluoropropylene (HFP), i.e. HFPI of 3.8, and 1.1 to 1.3 weight percent perfluoro(ethyl vinyl ether) (PEVE) commonly known as FEP, polymerized with ammonium persulfate (APS), initiator is used as the feed material. The polymer has an initial melt flow rate (MFR) of 31.9 to 32.5 g/10 min. The vacuum system is opened up after operation for 60 minutes without injecting any gas into the surface renewal zone, and a few small particles of waxy material are observed on the screen in the vacuum system. The weight ratio of waxy material to polymer processed through the extruder is 2 ppm. This is determined by subtracting the weight of the screen before the run from the weight of the screen plus oligomer after the run to determine the weight of oligomer collected and comparing this oligomer weight with the weight of fluoropolymer melt processed during the time of the melt processing run.

Example 2

Melt processing similar to Example 1 and using the same fluoropolymer as in Example 1, is conducted except the process is operated for 10 minutes without injecting any gas. Nitrogen is injected for 40 minutes at a 9,500 ppm weight ratio of nitrogen to fluoropolymer. The screen is removed. The screen is covered with a waxy solid similar to that analyzed in Example 1, but in a much greater amount. The weight ratio of waxy material (oligomer) to fluoropolymer processed through the extruder during the 40 min. run with nitrogen injection is 50 ppm (net amount after deducting the amount of oligomer collected during the 10 min of operation without any nitrogen injection)

In Example 2 the run is shut down before reaching 60 min run time to avoid blockage (plugging) of the vacuum system by the oligomer collecting on the screen.

The amount of oligomer removed in Example 2 represents the reduction in oligomer content from the starting fluoropolymer, i.e. the as-polymerized fluoropolymer. From these Examples, it is seen that that the minimum removal of 25 ppm oligomer is easily achieved. The small amount of oligomer removed when no gas is used as in Example 1 represents a greater amount than would be removed by conventional extrusion when a volatilization zone is included in the extruder.

In the following Examples, the fluoropolymer itself is tested for oligomer content by the reduction in particulates when subjected to the Smoke Detector Test. The test functions by capturing the voltage signal from the ionization chamber of a smoke detector and monitoring it as particulates are emitted from the fluoropolymer being tested at elevated temperatures flow through the ionization chamber. As the oligomer particles pass through the ionization chamber, the voltage signal changes, and the magnitude of the change is proportional to the amount of particulates passing through the chamber. By monitoring these voltage changes, the difference between oligomer content in the resins can be discerned.

In greater detail, the Smoke Detector Test is conducted as follows: A sample of fluoropolymer is heated in an air-supplied furnace at a specified temperature. The particulates emitted by the sample are concentrated (without condensing) by a funnel acting as a hood over the heated sample and flow with the air into a 20 L vessel containing the smoke detector. The purpose of the 20 L vessel is to provide a hold-up volume so that the ionization chamber of the smoke detector has sufficient time to detect materials passing through it. Changes in the output voltage of the smoke detector are recorded using a simple strip chart recorder. The gases pass out of the 20 L vessel through a water trap to collect any particulates emitted for subsequent particle size analysis. The particle size analysis shows a strong correlation with the voltage change, verifying that the smoke detector is a good particulate detector. Next, the gas stream passes through a flow meter, then to house vacuum. Control of the gas flow in the system is desirable since the voltage output of the smoke detector is proportional to the concentration of particulates passing through the ionization chamber.

For the furnace, a Thermolyne Type 6000 ashing furnace is used. Air is supplied to the furnace at 37 slpm. A 5" (12.7 cm) diameter stainless steel funnel welded to ⅜" (0.95 cm) ID stainless steel tubing is used to transfer the gas from the oven to the 20 L container, a Qorkpak® pail with a gasketed lid and pouring spout. The stainless steel tubing penetrates the bucket through a number four stopper in the pouring spout at the top of the container. The outlet gases and smoke detector voltage leads pass out of the bucket through a 2-hole number 12 stopper pressed into a 2 in (5.1 cm) hole cut near the bottom of the bucket. This location is selected to insure efficient air flow through the ionization chamber of the smoke detector.

The smoke detector used is a Kidde®-brand ionization smoke alarm, model number 0916. The smoke detector contains a 0.9 µCurie Americium 241 source (half life of 432 years) and a Motorola MC145017P ionization smoke detector integrated circuit chip. The detector used is less than two years old. The voltage leads are soldered to positions 14, 15, and 16 on the chip and power is supplied via a standard 9 V battery. Exposed to air, the voltage output of this circuitry is 4.9–5.0 V. The smoke detector sits in the middle of the 20 L container on a tripod covered with a non-conductive filled PTFE gasket.

The strip chart recorder used for this experiment is a Cole-Parmer 100 mm 0–5 V model with a chart speed of 1 cm/min. The water vacuum trap in this set-up is a 250 mL graduated cylinder filled with 100±0.5 g HPLC-grade water from J.T. Baker and is connected to both the 20 L container and the flow meter with latex tubing. The flow meter is a Gilmont size 13 flow meter with a range of 200–14,000 mL/min. Air flow through the system, as determined via this flow meter, is 6 L/min and is adjusted directly via the connection to house vacuum.

Fluoropolymer samples tested in this Test are 25 mil (0.64 mm) films that are hot-pressed (5 min at 350° C., then 5 min under cold pressure). Squares of these films weighing 1.00±0.05 g are held at oven temperatures ranging from 200° C. and 350° C. for 60 min while changes in the voltage output of the smoke detector are recorded on the strip chart.

These temperatures simulate high service temperatures, 200° C. being the maximum service temperature for FEP, and melt processing temperature, respectively. Clean water is placed in the vacuum trap for each experiment and the gases are bubbled through it for 60 min, the sample is removed from the oven, and gases are bubbled through for an additional 5 min, for a total of 65 min gas collection time. The vacuum trap is then removed and the system is allowed to purge for an additional 5 min to remove any residual material—the total system purge time is therefore 10 min. The heating of the film samples is conducted in small, 5" (12.7 cm) diameter aluminum pie pans that have been previously heated to 385° C. for 10 min to remove residual manufacturing oils.

For each sample tested, the maximum voltage change is reported as the difference between the baseline (empty) value and the lowest voltage recorded on the strip chart during the entire run. This correlates well with the integral of the area between the baseline voltage and the voltage change curve.

Example 3

Film samples of the fluoropolymer obtained from the melt processing of Examples 1 and 2 are subjected to the Smoke Detector Test, at 200° C., which is the upper continuous use temperature for this fluoropolymer, with the following results:

| Fluoropolymer Treatment | Voltage Change - volts |
|---|---|
| no gas | 0.6 |
| nitrogen | 0.45 |

The voltage change when nitrogen is used is 75% of the voltage change when no gas is used, representing a reduction by more than 20% from the voltage change obtained for the fluoroplymer when no gas is used during the melt processing.

Example 4

Film samples of the fluoropolymer obtained from the melt processing of Examples 1 and 2 are subjected to the Smoke Detector Test, at 350° C. with the following results:

| Fluoropolymer Treatment | Voltage Change - volts |
|---|---|
| no gas | 2.4 |
| nitrogen | 1.9 |

The greater voltage change when the Test is carried out at 350° C. as compared to 200° C. indicates the relatively large amount of oligomer remaining in the fluoropolymer, i.e. having a significant vapor pressure only above 200° C.

A commercially obtained sample of FEP from another manufacturer, labeled as NP-101, gives a voltage change of 2.5 volts.

What is claimed is:

1. Process for lowering the oligomer content of melt-processible fluoropolymer, comprising
   (a) melting said fluoropolymer,
   (b) forming a surface of said molten fluoropolymer,
   (c) regenerating said surface,
   (d) contacting said regenerating surface of said molten fluoropolymer with inert gas,
   (e) devolatilizing the resultant molten fluoropolymer to obtain as a result thereof said fluoropolymer having less oligomer, and
   (f) cooling the devolatilized fluoropolymer.

2. The process of claim 1 lowering said oligomer content by at least about 25 ppm.

3. The process of claim 1 further comprising, melt fabricating the fluoropolymer prior to or after said cooling.

4. The process of claim 1 lowering the oligomer content of said fluoropolymer, whereby when said fluoropolymer having said lowered oligomer content is subjected to the Smoke Detector Test at the upper continuous use temperature for said fluoropolymer, said fluoropolymer exhibits a reduction in voltage change by at least about 20% of the voltage change for said fluoropolymer as-polymerized.

5. The process of claim 1 wherein said fluoropolymer is copolymer of tetrafluoroethylene and hexafluoropropylene and said lowering the oligomer content of said copolymer is characterized by said copolymer exhibiting a voltage change of either no greater than about 0.025 volts at 200° C. or no greater than about 2 volts at 350° C. when subjected to the Smoke Detector Test.

* * * * *